*(12)* United States Patent
De Medeiros

*(10)* Patent No.: US 8,132,102 B2
*(45)* Date of Patent: Mar. 6, 2012

(54) MESSAGING INTERFACE SYSTEMS AND METHODS

(75) Inventor: Anderson Vinicius De Medeiros, Hortolandia (BR)

(73) Assignee: Motorola Mobility, Inc., Libertyville, IL (US)

( * ) Notice: Subject to any disclaimer, the term of this patent is extended or adjusted under 35 U.S.C. 154(b) by 658 days.

(21) Appl. No.: 12/259,886

(22) Filed: Oct. 28, 2008

(65) Prior Publication Data

US 2010/0107087 A1    Apr. 29, 2010

(51) Int. Cl.
*G06F 13/00* (2006.01)
*G06F 15/00* (2006.01)

(52) U.S. Cl. ........................ 715/715; 715/743
(58) Field of Classification Search .................. 715/715, 715/757, 763–765, 740–743, 851, 752, 790
See application file for complete search history.

(56) References Cited

U.S. PATENT DOCUMENTS 6,772,195 B1 *  8/2004  Hatlelid et al. ............... 709/204
6,784,901 B1 *  8/2004  Harvey et al. ................. 715/757

* cited by examiner

*Primary Examiner* — Cao "Kevin" Nguyen (57) ABSTRACT

Disclosed are systems and methods for delivering a plurality of sender messages and recipient messages on an interface. The interface can receive a first sender message, the first sender message being displayed in a first format on the interface so that the first sender message is graphically associated with a sender graphic. The interface can receive a second sender message being displayed in a second format on the recipient interface. A format can be any feature, characteristic, attribute and/or appearance of any kind of a sender's message or recipient's message. Also disclosed is a selection tool to allow the visualization of a conversation history for a particular individual by performing a selection command over the communication of that individual wherein when the selection tool provides a selection of the first sender message, the first sender message assumes the second format or a third format.

16 Claims, 6 Drawing Sheets

MESSAGING INTERFACE SYSTEMS AND METHODS

FIELD

Disclosed are systems and methods for delivering a plurality of sender messages and recipient messages on an interface.

BACKGROUND

Instant messaging (IM) and chat are forms of real-time communication between two or more users based on typed text. Written communication is conveyed via communication devices such as computers connected over a network such as the Internet. In a chat room, a group of people can type in messages that are seen by everyone in the "room." Instant messages are usually between two people.

Current instant messaging services rely on a text window with a scrollbar. The communication proceeds with one's message just below, or above, the previous one, in a two dimensional (2D) visualization. Each message is identified by an image or a nickname of its speaker, eventually also informing the time of speaking (writing). In order to see previous communication, the user must scroll up or down the window. It is also difficult to easily see one's speech separated from the other's speech. It is also difficult to determine instances of the string of communication.

DETAILED DESCRIPTION

It would be beneficial if it were easy to see one's messages separated another's messages. It would also be beneficial if messages were to give the impression that one communication is on top of another to indicate their position in time. It would also be beneficial to provide a selection tool to allow the visualization of a conversation history for a particular individual by performing a selection command over the communication of that individual.

Disclosed are systems and methods for delivering a plurality of sender messages and recipient messages on an interface. The interface can receive a first sender message, the first sender message being displayed in a first format so that the first sender message is graphically associated with the sender graphic. The interface can receive a second sender message, the second sender message being displayed in a second format so that the second sender message is graphically associated with the sender graphic. In this way, it is easier to see one's speech separated from the other's speech. Accordingly, it is also easier to determine instances of the string of communication. The format of the first message and the format of the second message can be different from each other. In this way, it may be beneficial if the speech were to give the impression that one communication is on top of another to indicate their position in time. Differences in the format may include, for example, a difference in size, shape, color, transparency, sharpness and the like. It would also be beneficial to provide a selection tool to allow the visualization of a conversation history for a particular individual by performing a selection command over the communication of that individual. When the selection tool provides a selection of the first sender message, the first sender message assumes the second format or a third format.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 1:
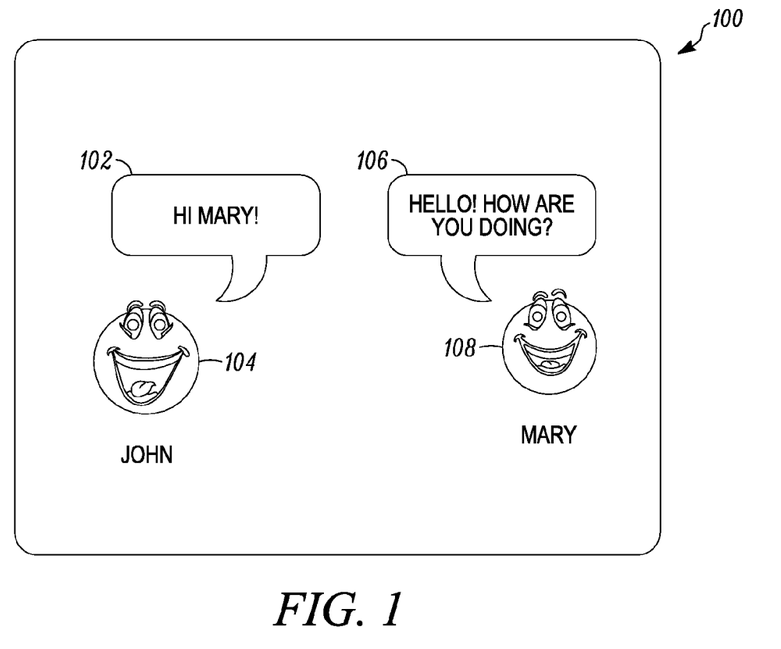
FIG. 1 illustrates an embodiment of a recipient's interface.

FIGS. 1, 2, 3 and 4 illustrate a plurality of sender messages and recipient messages displayed on an interface, for example, a recipient interface with continuing communication stream. FIG. 1 illustrates an embodiment of a recipient's interface 100 wherein the sender's, "John's" first message 102 is displayed in a first format so that it is graphically associated with the sender graphic 104. Also, the recipient's, "Mary's" message 106 is displayed in a similar format so that the recipient message is graphically associated with the recipient graphic 108. The format of "Mary's" message 106 need not be similar to that of "John's" message 102.

In IM and Chat systems, typically, the plurality of sender messages and recipient messages are typed by the parties. It is understood that any manner in which the plurality of messages are input into the system so that they are received by the recipient interface 100, is within the scope of this discussion. For example, a system may include a speech recognition capability that translates actual speech into written text so that it is received by the system including the recipient interface 100. Moreover, the typed text received by the recipient interface 100 may be computer generated. It is understood that any process or manner in which the text is delivered to the recipient interface 100 so that the recipient interface 100 displays a plurality of sender and/or recipient messages is within the scope of this discussion.

An interface 100 may be any type of display interface. For example, an interface may be, for example, part of a computer system, a television system, a gaming system, and the like. Moreover, the interface may be part of a mobile communication device such as a cellular telephone (also called a mobile phone). Both fixed and mobile communication devices represent a wide variety of devices that have been developed for use within various networks. For example, such devices can include cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP). Of course, messages may be delivered to the interface via wired or wireless technologies.

Figure 2:
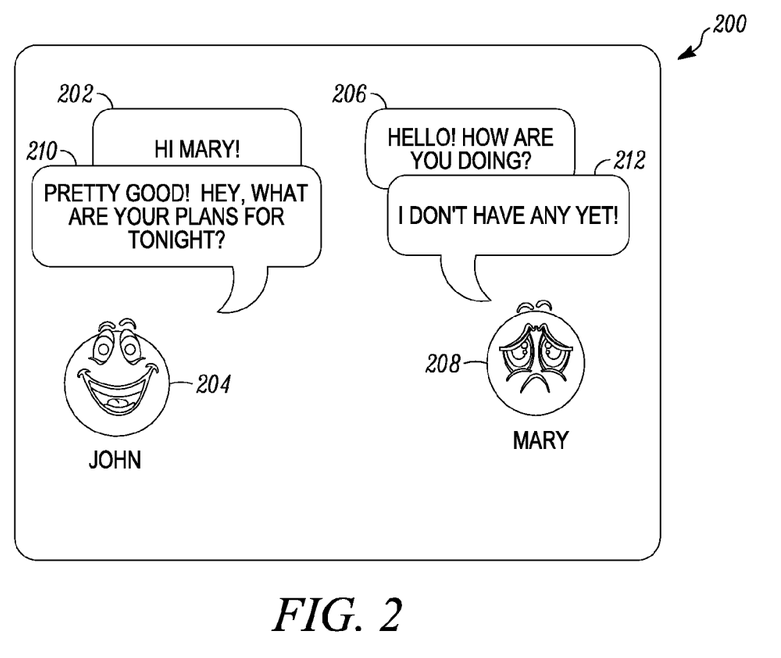
FIG. 2 illustrates an embodiment of a recipient's interface continuing a conversation of FIG. 1.

FIG. 2 illustrates an embodiment of a recipient's interface 200 continuing a conversation wherein the sender's, "John's" first message 202 and the sender's second message 210, are displayed. The sender's second message 210 is displayed in a second format so that the sender message 210 is graphically associated with the sender graphic 204. Also, the recipient's, "Mary's" message 206 and a subsequent message 212 is displayed in a similar format so that the recipient message is graphically associated with the recipient graphic 208. The second sender message 210 graphically overlaps the first sender message 202. Moreover, in this example, the second recipient message 212 graphically overlaps the first recipient message 206. In the illustrated embodiment, the second sender message 210 partially overlaps the first sender message 202. It is understood that the second sender message 210 can graphically entirely overlap the first sender message 202. In this way the speech or messages can give the impression that one communication is on top of another to indicate their position in time.

In the example of FIG. 2, the first format of the first sender message 202 is a bubble having a particular size. The second format of the second sender message 210 is a bubble having a particular size being different from that of the first format. That is, in this embodiment the first format and the second format differ in size. The first format and the second format can differ in any manner. For example, the first format is at least one of a bubble format and a jagged edged format. In another embodiment, the first format and the second format differ in color. In another embodiment, the first format and the second format differ in shape. In still another embodiment, the first format and the second format differ in transparency. In yet another embodiment, the first format is a font having a first color and the second characteristic is a font having a second color. In still another embodiment the first format is crisp font and the second characteristic is non-crisp or blurred font. Crisp may considered sharp and/or having distinct borders. In yet another embodiment, the first format is a font having a first size and the second characteristic is a font having a second size. And then in another embodiment, the first format is a first color and the second format is a second color.

In still another embodiment, to provide the feeling of a three dimensional environment, an older message may be small and/or unclear, giving the impress that it was said some time before. Gray scale may be used to indicate prior messages in time. Black text may correspond to the latest conversations. Older conversations may be gradually whitened. Format differences may be as discussed herein or otherwise and/or may be combined in any manner so that the format of the messages is different. It is understood that a format can be any feature, characteristic, attribute and/or appearance of any kind of a sender's message or recipient's message. Variations in the formats may be subtle or pronounced.

Figure 3:
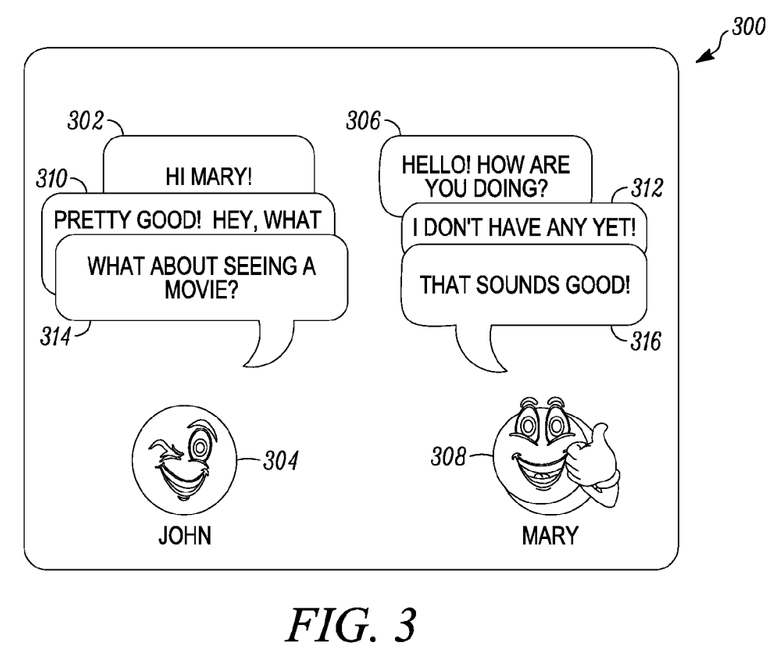
FIG. 3 illustrates an embodiment of a recipient's interface continuing the conversation of FIGS. 1 and 2.

FIG. 3 illustrates an embodiment of the system for delivering a plurality of sender messages and recipient messages wherein the same conversation of FIG. 2 is continued. A plurality of messages is delivered to a recipient's interface 300 wherein the sender's, "John's" first message 302 and the sender's second message 310 is depicted. John's third message is displayed in a third format and is graphically associated with the sender graphic 304. Also, the recipient's, "Mary's" message 306 and subsequent messages 312 and 316 are displayed in a similar format so that the recipient messages are graphically associated with the recipient graphic 308. In this embodiment, the third sender message 314 graphically overlaps the second sender message 310. As mentioned, in this way the format of the speech or messages and position with respect to the sender's graphic 304 can give the impression that one communication is on top of another to indicate their position in time. Moreover, the described different formats better enable a user to see a party's messages or speech separated from the another party's messages speech when the messages are associated with one or the other of the sender's graphic 304 or the recipient graphic 308.

Figure 4:
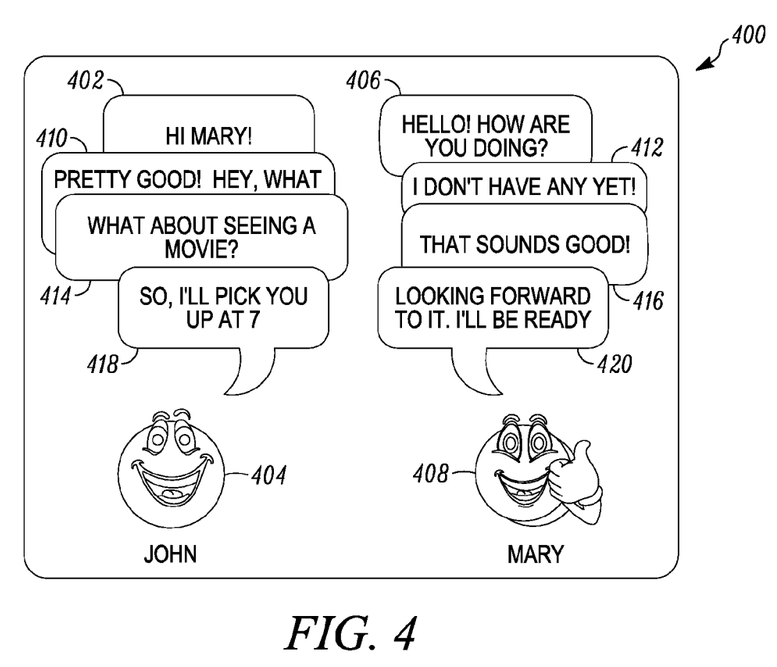
FIG. 4 illustrates an embodiment of a recipient's interface continuing the conversation of FIGS. 1, 2 and 3.

FIG. 4 illustrates the system for delivering a plurality of sender messages and recipient messages wherein the same conversation of FIG. 3 is continued. A plurality of messages is delivered to a recipient's interface 400 wherein the sender's, "John's," first message 402 and sender's second message 410 is depicted. The sender's third message 414 is displayed in a third format and is graphically associated with the sender graphic 404. The sender's fourth message 418 is displayed in a fourth format and is graphically associated with the sender graphic 404. Also, the recipient's, "Mary's" message 406 and subsequent messages 412, 416 and 420 are displayed in a similar format so that the recipient messages and are graphically associated with the recipient graphic 408. Moreover, in this example, the fourth sender message 418 graphically partially overlaps third sender message 414. As mentioned, in this way the format of the speech or messages and position with respect to the sender's graphic 404 can give the impression that one communication is on top of another to indicate their position in time.

Figure 5:
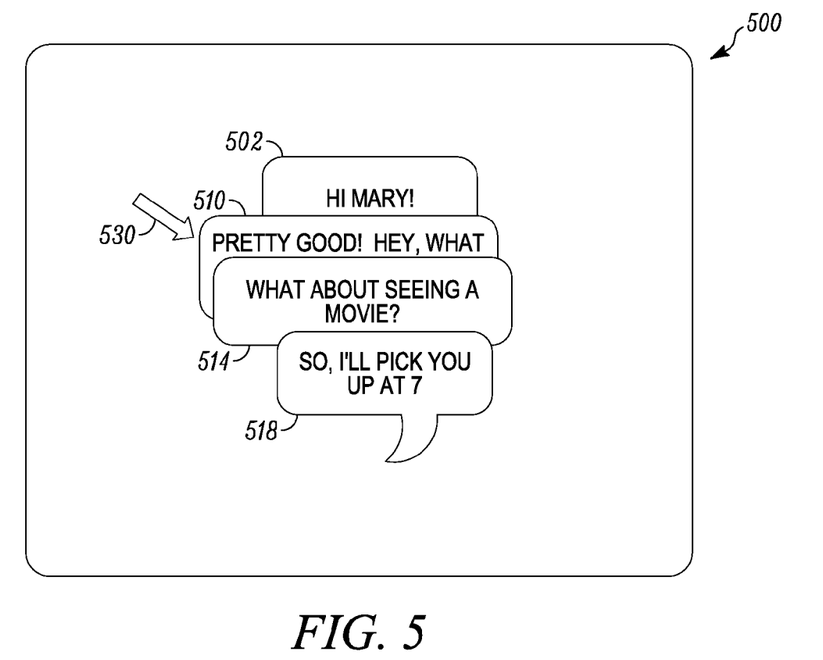
FIG. 5 illustrates an embodiment of a system wherein the recipient interface displays a selection tool.

FIG. 5 illustrates an embodiment of a system wherein the recipient interface 500 displays a selection tool 530. The selection tool 530 can be used to select a particular message, in this case the second sender message 510 is selected. It is understood that while the messages of the sender and the recipient have been named for convenience, when now describing the selection tool 530, the name of the messages of the sender and the recipient may be different. For example, the name of the sender message 510 is now referred to as the second sender message 510 for convenience in this description whereas the first sender message is referred to as 518.

Figure 6:
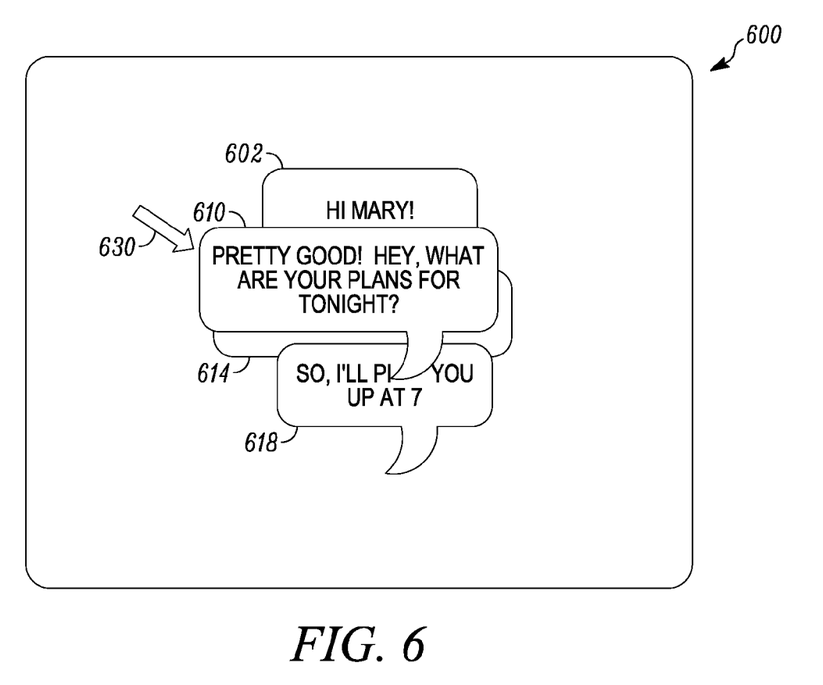
FIG. 6 illustrates an embodiment of a system wherein the recipient interface displays that the selection tool provides a selection of a message.

FIG. 6 illustrates an embodiment of a system similar to FIG. 5 wherein the recipient interface 600 displays that the selection tool 630 provides a selection of the first sender message 610 named similarly as that of FIG. 5. According to the selection of first sender message 610 by selection tool 630, the first sender message 610 assumes the format of the second sender message 618. Before selection by the selection tool 530 (see FIG. 5) the second sender message 518 graphically at least one of entirely and partially overlaps the first sender message 510. The selection tool 630 provides a selection of the first sender message 610 so that the first sender message 610 assumes the second format. That is, by selecting the first sender message 610, the first sender message 610 graphically at least one of entirely and partially overlaps the second sender message 618. It may also be noted that the first sender message 610 graphically at least one of entirely and partially overlaps a third sender message 614. Alternatively, it may also be noted that the first sender message 610 graphically at least one of entirely and partially overlaps another message 602 which for convenience may be named, in this alternative, the third message 602. In this way, a selection tool may allow the visualization of a conversation history for a particular individual by performing a selection command over the communication of that individual.

Figure 7:
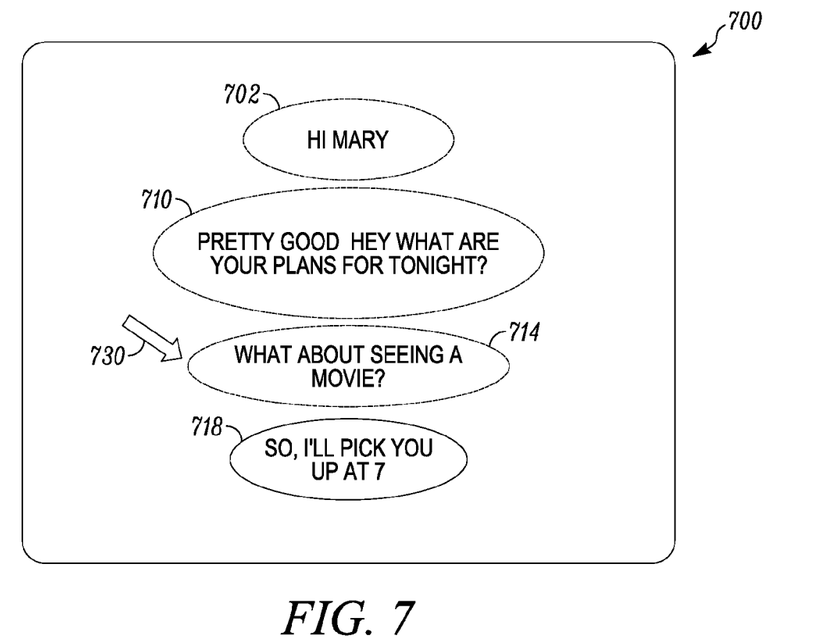
FIG. 7 illustrates another embodiment of a system wherein the recipient interface displays a selection tool.

FIG. 7 illustrates an embodiment of a system wherein the recipient interface 700 displays a selection tool 730. The selection tool 730 can be used to select a particular message, in this case the first sender message 714. In this example, the format of the first message 714 and the second message 718 differ in that first message 714 is non-crisp or blurred and the second message 718 is crisp or sharp. The dotted lines of FIG. 7 may be taken to illustrate which of the messages are non-crisp.

Figure 8:
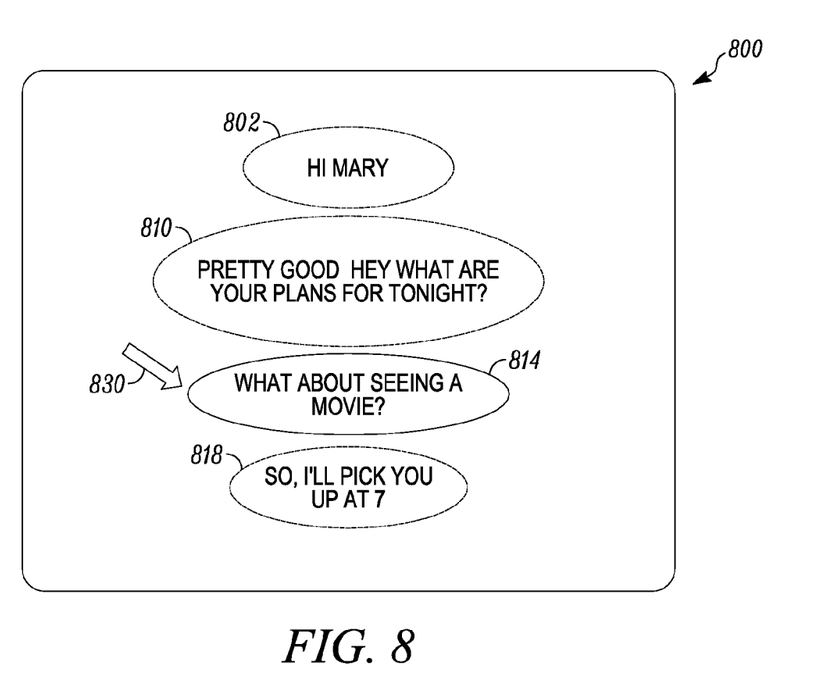
FIG. 8 illustrates an embodiment of a system wherein the recipient interface displays a selection tool that provides a selection of a message.

FIG. 8 illustrates an embodiment of a system wherein the recipient interface 800 displays a selection tool 830 that provides a selection of the first sender message 814. The format of the first sender message 814 has been assumed by the second sender message 818. That is, the first sender message 814 is crisp or sharp and the second sender message 818 is non-crisp or blurred. The dotted lines of FIG. 8 may be taken to illustrate which of the messages are non-crisp. As mentioned above, a format can be any feature, characteristic, attribute and/or appearance of any part of a sender's message or recipient message. Accordingly, in another embodiment, for example colors may be exchanged. Also, a different format than one that is already exhibited on the interface 800 may displayed. For example, a third format different from those depicted may be exhibited to highlight the choice of the selection tool 830.

Figure 9:
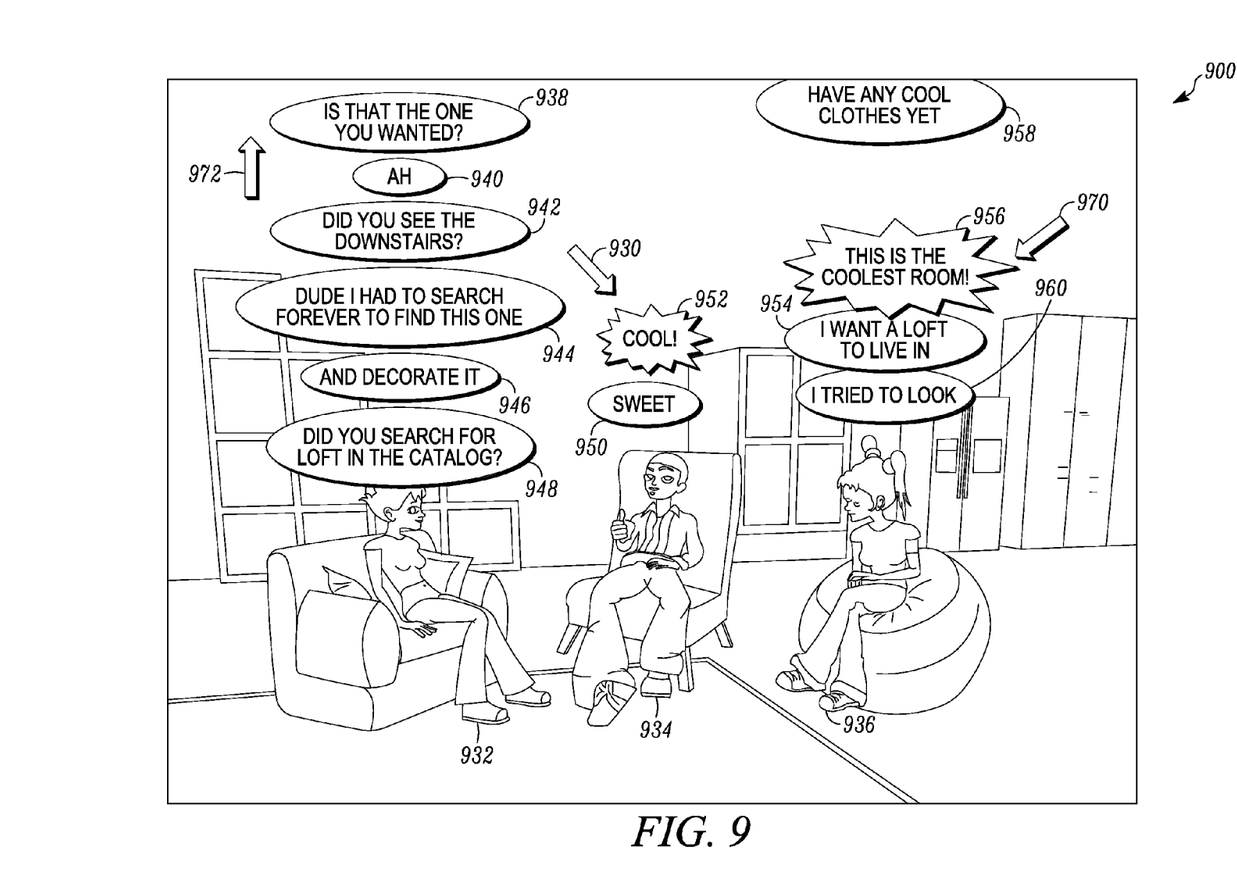
FIG. 9 illustrates an embodiment of a system for delivering a plurality of sender messages and recipient messages in a chat format.

FIG. 9 illustrates a system for delivering a plurality of sender messages and recipient messages in a chat format embodiment. For example, party 932, party 934 and party 936 may all be senders, or in the alternative, one may be a recipient, such as party 932. In this example, the interface 900 exhibits that a plurality of messages 938, 940, 942, 944, 946 and 948 are associated with a party graphic 932. The format of the plurality of messages 938, 940, 942, 944, 946 and 948 is oval shapes of different sizes. Furthermore, a plurality of message 950 and 952 are associated with party graphic 934. Also, a plurality of messages 952, 956, 958 and 960 are associated with party graphic 936. The interface 900 may also implement a clustering technique to approximate parties, for example, party 932 and 934 who provide messages constantly to one another.

FIG. 9 further illustrates two selection tools 930 and 970. The selection tools 930 and 970 provide a selection of the messages 952 and 960 respectively in third format having a jagged edged format. The selection tool may be used in a similar manner to a scroll bar. To determine parts of messages not shown on the interface 900 at a particular time, the selection tool may be pointed in an upward direction or otherwise indicate a manner in which to access messages not presently visible on the interface 900. In this way, the selection tool 972, for example, may be pointed in an upwards direction so that the previous conversation scrolls in the downward direction. The selection tool 972 may be manipulated to highlight a particular message or messages at any time.

Figure 10:
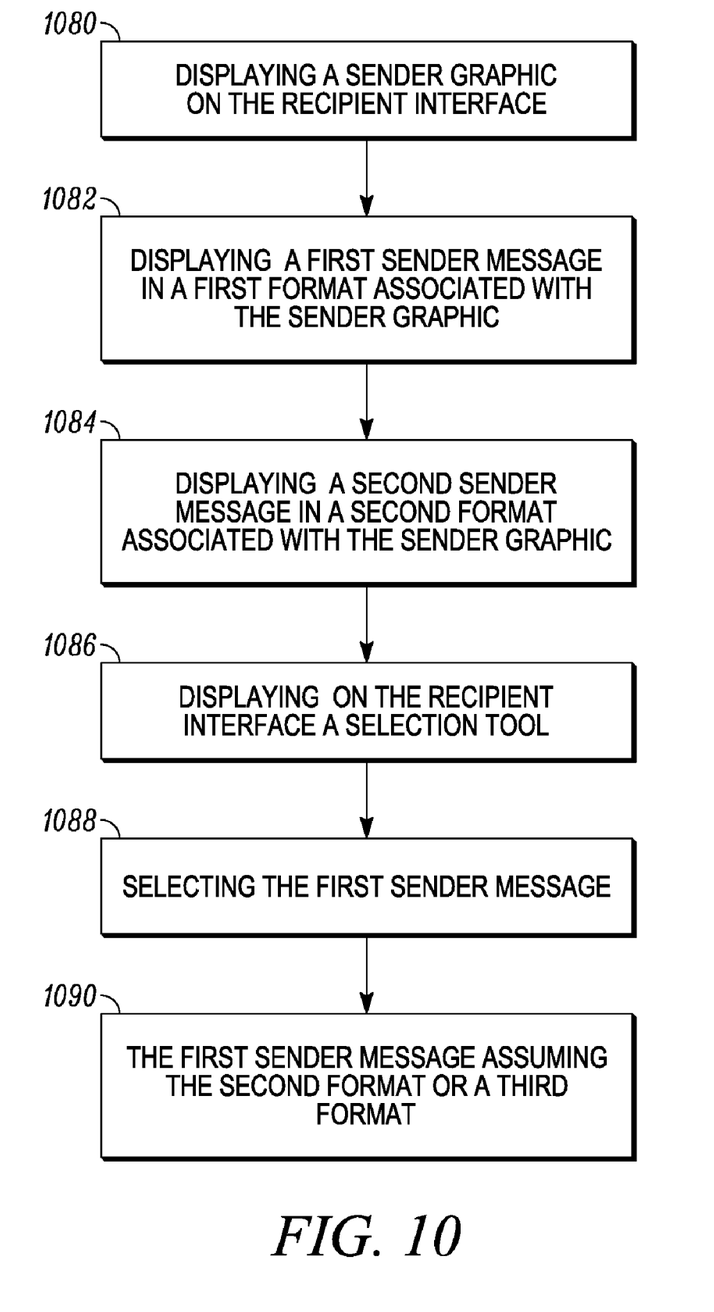
FIG. 10 is a flowchart of an embodiment of the method of the system for delivering a plurality of sender messages and recipient messages.

FIG. 10 is a flowchart of an embodiment of the method of the system for delivering a plurality of sender messages and recipient messages. The method can include, for example, displaying 1080 a sender graphic the recipient interface, displaying 1082 a first sender message in a first format so that the first sender message is graphically associated with the sender graphic, and displaying 1084 a second sender message in a second format so that the second sender message is graphically associated with the sender graphic. Additionally, the method can include displaying 1086 on the recipient interface a selection tool, selecting 1088 the first sender message and upon selection of the first sender message, the first sender message assuming 1090 at least one of the second format and a third format. It is understood that this discussion is also applicable to any graphically and text based depicted communication between parties, including those not in real-time, such as those of intermittently connected networks or other types of delayed communication.

As mentioned above, the order of the messages and the naming of the parties is for convenience. As depicted in the figures, the recipient interface or sender interface display can display a recipient graphic wherein when the recipient interface receives a first recipient message, the first recipient message is displayed in the first format on the recipient interface so that the first recipient message is graphically associated with the recipient graphic and wherein when the recipient interface receives a second recipient message, the second recipient message is displayed in the second format on the recipient interface so that the second recipient message is graphically associated with the recipient graphic. Just as a sender message may assume a second format or a third format, a recipient message may assume second format or a third format. There may be more than one sender, and more than one recipient.

Disclosed are a system and method for delivering a plurality of sender messages and recipient messages to an interface. The interface can receive a first sender message, the first sender message being displayed in a first format on the interface so that the first sender message is graphically associated with the sender graphic. The interface can receive a second sender message, the second sender message being displayed in a second format on the recipient interface so that the second sender message is graphically associated with the sender graphic. In this way, it is easier to see one's speech separated from the other's speech. Accordingly, it is also easier to determine instances of the string of communication. The format of the first message and the format of the second message can be different from each other. In this way, it may be beneficial if the speech were to give the impression that one communication is on top of another to indicate their position in time. Differences in the format may include, for example, a difference in size, shape, color, transparency, sharpness and the like. It may also be beneficial to provide a selection tool to allow the visualization of a conversation history for a particular individual by performing a selection command over the communication of that individual.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A system for delivering a plurality of sender messages and recipient messages, comprising:
    a recipient interface; and
    wherein the recipient interface displays a sender graphic;
    wherein when the recipient interface receives a first sender message, the first sender message is displayed in a first format on the recipient interface so that the first sender message is graphically associated with the sender graphic, wherein the first format is at least one of a bubble format or a jagged edged format;
    wherein when the recipient interface receives a second sender message, the second sender message is displayed in a second format on the recipient interface so that the second sender message is graphically associated with the sender graphic, and
    wherein the second sender message at least partially, graphically overlaps the first sender message.

2. The system of claim 1, wherein the recipient interface displays a selection tool; and
    wherein when the selection tool provides a selection of the first sender message, the first sender message assumes the second format.

3. The system of claim 1, wherein the recipient interface displays a selection tool; and
    wherein when the selection tool provides a selection of the first sender message, the first sender message assumes a third format.

4. The system of claim 1, wherein the recipient interface displays a selection tool; and
    wherein when the selection tool provides a selection of the first sender message, the first sender message graphically overlaps the second sender message.

5. The system of claim 1, wherein the first format and the second format differ in color.

6. The system of claim 1, wherein the first format and the second format differ in size.

7. The system of claim 1, wherein the first format and the second format differ in shape.

8. The system of claim 1, wherein the first format and the second format differ in transparency.

9. The system of claim 1, wherein the first format is a font having a first color and the second characteristic is a font having a second color.

10. The system of claim 1, wherein the first format is crisp font and the second characteristic is non-crisp font.

11. The system of claim 1, wherein the first format is a font having a first size and the second characteristic is a font having a second size.

12. The system of claim 1, wherein the first format is a first color and the second characteristic is a second color.

13. The system of claim 1, wherein the recipient interface displays a recipient graphic; and
    wherein when the recipient interface receives a first recipient message, the first recipient message is displayed in the first format on the recipient interface so that the first recipient message is graphically associated with the recipient graphic; and
    wherein when the recipient interface receives a second recipient message, the second recipient message is displayed in the second format on the recipient interface so that the second recipient message is graphically associated with the recipient graphic.

14. A system for selecting a message from a plurality of messages between a sender and a recipient, comprising:
    a recipient interface; and
    wherein when the recipient interface receives a first sender message, the first sender message, in a first format having a first characteristic, is displayed on the recipient interface, wherein the first format is at least one of a bubble format or a jagged edged format;
    wherein when the recipient interface receives a second sender message, the second sender message, in a second format having a second characteristic, is displayed on the recipient interface;
    wherein the recipient interface displays a selection tool;
    wherein when the selection tool provides a selection of the first sender message, the first sender message assumes at least one of the second format and the second characteristic, and
    wherein the second sender message at least partially, graphically overlaps the first sender message.

15. The system of claim 14, wherein when the recipient interface receives a first recipient message, the first recipient message in a first format having a first characteristic is displayed on the recipient interface;
    wherein when the recipient interface receives a second recipient message, the second recipient message, in a second format having a second characteristic, is displayed on the recipient interface;
    wherein the recipient interface displays a selection tool; and
    wherein when the selection tool provides a selection of the first recipient message, the first recipient message assumes at least one of the second format and the second characteristic.

16. The system of claim 14, wherein when the selection tool provides a selection of the first sender message, the first sender message assumes at least one of a third format and a third characteristic.

* * * * *